United States Patent

[11] 3,601,811

| [72] | Inventor | Hirokazu Yoshino<br>Osaka, Japan |
|---|---|---|
| [21] | Appl. No. | 782,374 |
| [22] | Filed | Dec. 9, 1968 |
| [45] | Patented | Aug. 24, 1971 |
| [73] | Assignee | Matsushita Electric Industrial Co., Ltd.<br>Osaka, Japan |
| [32] | Priority | Dec. 18, 1967, Oct. 15, 1968, Nov. 20, 1968 |
| [33] | | Japan |
| [31] | | 42/82473 43/75769, 43/85747 |

[54] LEARNING MACHINE
6 Claims, 10 Drawing Figs.

[52] U.S. Cl. .................................................. 340/172.5,
340/146.3 T
[51] Int. Cl. ........................................................ G06f 11/00
[50] Field of Search ............................................ 340/146.3,
172.5, 146.3 T; 307/201

[56] References Cited
UNITED STATES PATENTS

| 3,046,527 | 7/1962 | Rowley et al. ................ | 340/172.5 X |
| 3,097,349 | 7/1963 | Putzrath et al. ................ | 340/172.5 |
| 3,106,699 | 10/1963 | Kamentsky ................... | 340/172.5 |
| 3,158,840 | 11/1964 | Baskin .......................... | 340/172.5 |
| 3,324,457 | 6/1967 | Ogle et al. ..................... | 340/172.5 |
| 3,408,627 | 10/1968 | Kettler et al. .................. | 340/172.5 |
| 3,440,617 | 4/1969 | Lesti .............................. | 340/172.5 |

*Primary Examiner*—Paul J. Henon
*Assistant Examiner*—Paul R. Woods
*Attorney*—Stevens, Davis, Miller & Mosher ABSTRACT: A learning machine having a decision element, a comparator, a learning pulse generator, a monostable circuit, a multistable circuit, a control switch circuit and a signal delay circuit. All these circuits are in the form of logic circuits whereby the machine can fully automatically and digitally be controlled until an actual output derived in response to application of input patterns coincides with a desired output value for the correct classification of the input patterns.

PATENTED AUG 24 1971　　3,601,811
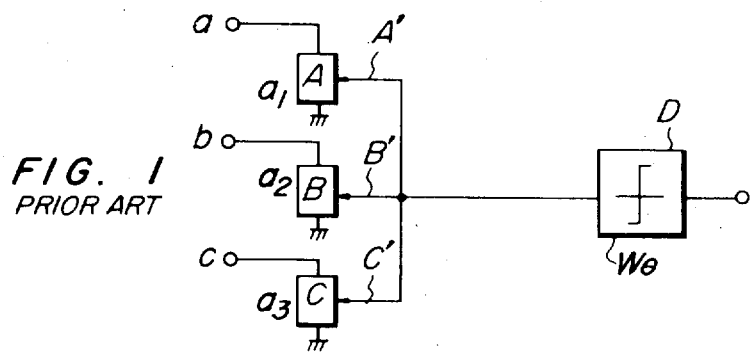
FIG. 1
PRIOR ART
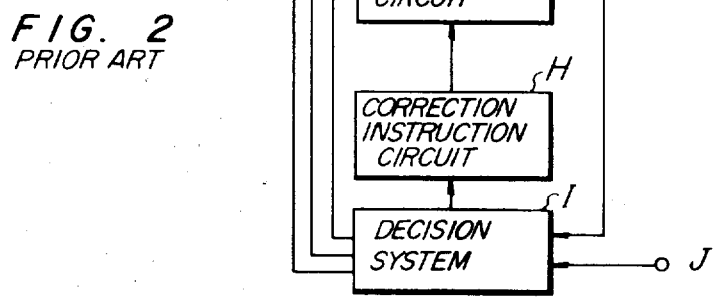
FIG. 2
PRIOR ART
FIG. 5b
$X_1=1$, $X_2=0$, $X_3=$,---
TRIGGER INPUT
OUTPUT FROM 27 
OUTPUT FROM 33 
FIRST OUTPUT FROM 30 
OUTPUT FROM 35 
SECOND OUTPUT FROM 30
THIRD OUTPUT FROM 30 
INVENTOR
HIROKAZU YOSHINO
BY Stevens, Davis, Miller & Mosher
ATTORNEYS

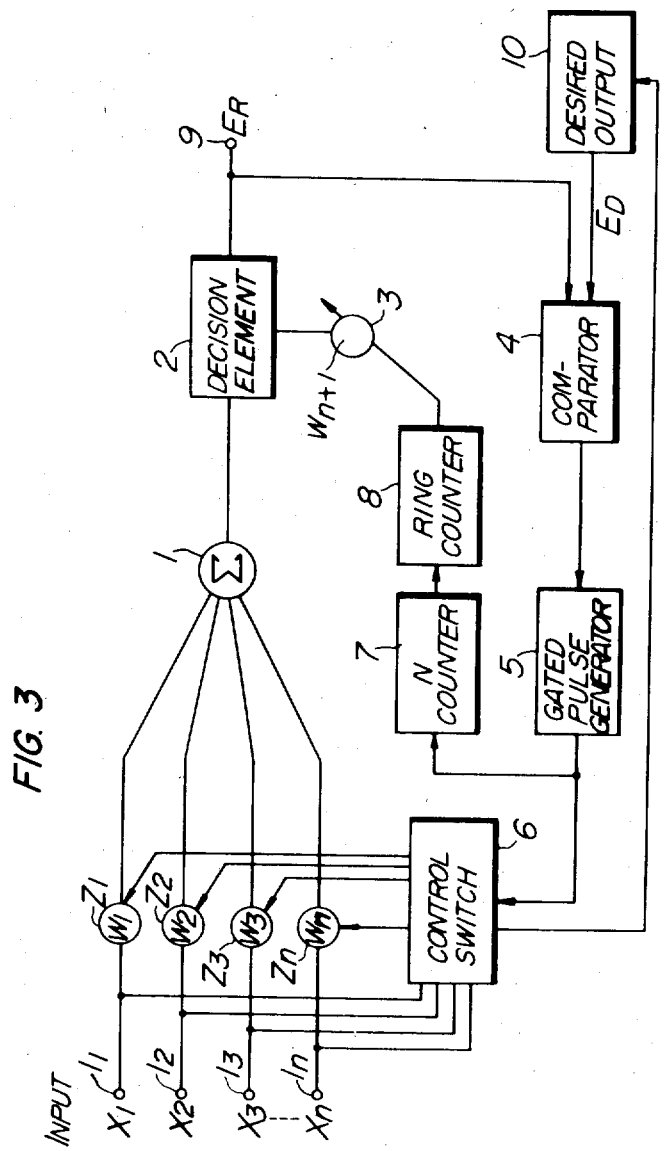

FIG. 6b
(a) IN CASE THE WEIGHTS ARE DECREASED: $E_R = 1$, $E_D = 0$
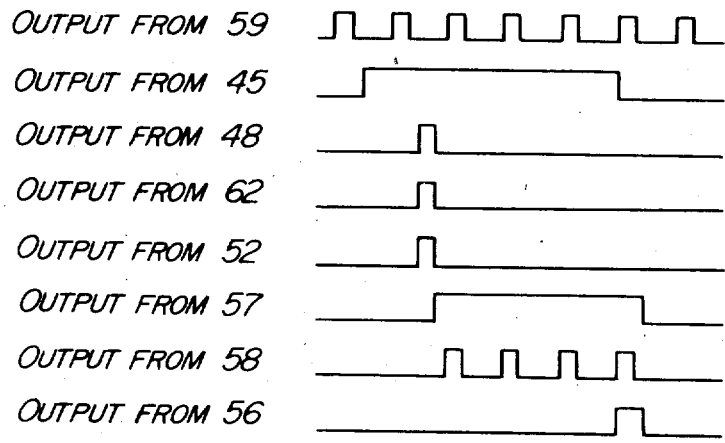
(b) IN CASE THE WEIGHTS ARE INCREASED: $E_R = 0$, $E_D = 1$
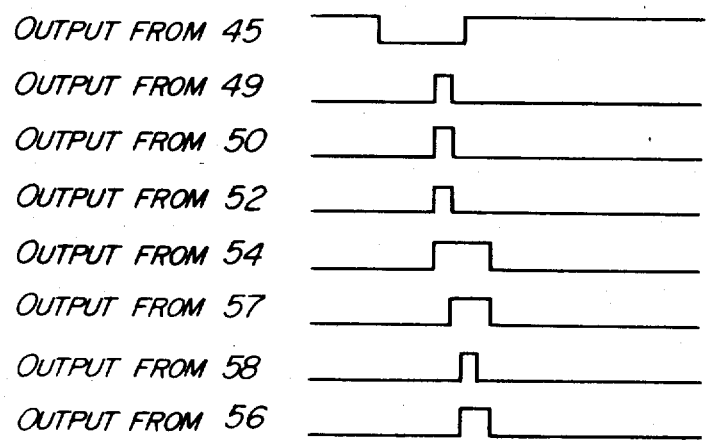

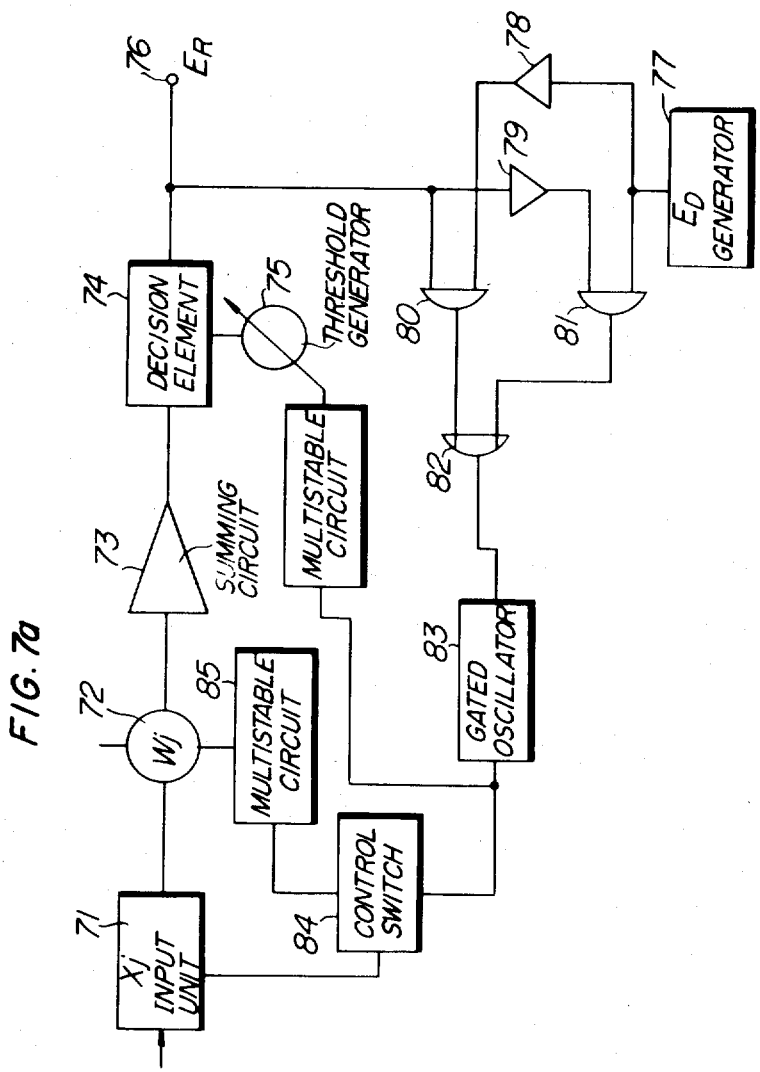

LEARNING MACHINE

This invention relates to a learning machine in which an actual output delivered from an adaptive logic circuit is compared with a desired output to derive an error voltage so as to effect the control of weight elements depending on the sign of the error voltage.

It is an object of the present invention to provide a novel learning machine which can be operated under full-automatic digital control so that input patterns can correctly be classified.

Another object of the present invention is to provide a learning machine which can easily be constructed from integrated circuit elements.

The above and other objects, features and advantages of the present invention will be apparent from the following detailed description of a few preferred embodiments taken in conjunction with the accompanying drawings, in which:

FIG. 1 is a block diagram of an adaptive logic circuit employed in a prior art learning machine;

FIG. 2 is a block diagram of a learning machine employing the circuit shown in FIG. 1;

FIG. 3 is a block diagram showing the basic structure of the learning machine according to the present invention;

FIG. 5b is a timing chart showing various waveforms appearing in the embodiment shown in FIG. 5a;

Figure 6A:
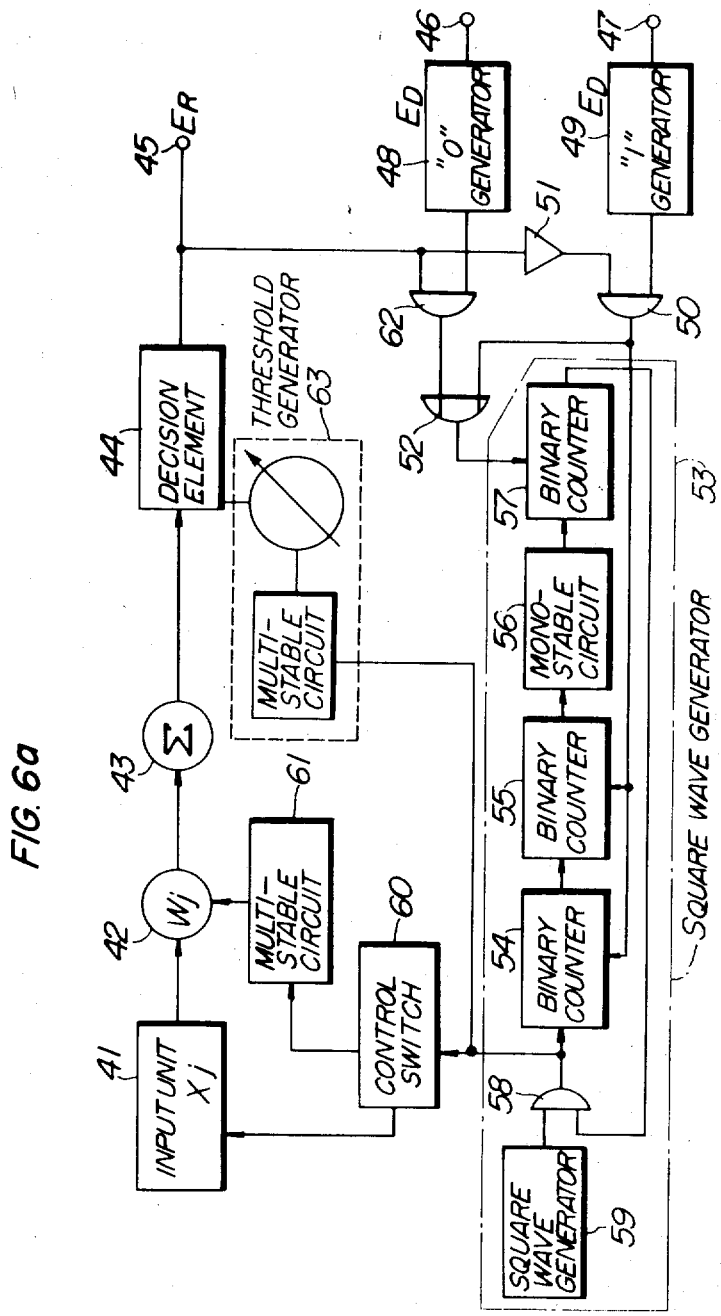
FIG. 6a is a block diagram of another embodiment of the present invention.
Figure 7B:
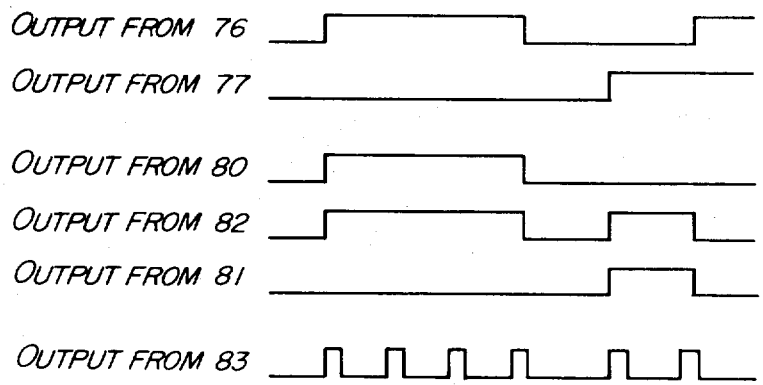

FIG. 6b presents timing charts showing various waveforms appearing in the embodiment shown in FIG. 6a;

FIG. 7a is a block diagram of a further embodiment of the present invention; and FIG. 7b is a timing chart showing various waveforms appearing in the embodiment shown in FIG. 7a.

Referring to FIG. 1, an adaptive logic circuit employed in prior art learning machines comprises weight elements A, B and C which are commonly in the form of potentiometers. Input signals $a$, $b$ and $c$ are applied to the respective weight elements A, B and C. Control voltages are applied to the respective weight elements A, B and C for controlling the weight thereof. It will be apparent that a rotating force is applied to each of the weight elements A, B and C when they are potentiometers. Each of the inputs $a$, $b$ and $c$ is one of a set "+1" and "0" or one of a set of numerals "+1" and "−1." The inputs $a$, $b$ and $c$ are multiplied by weights $a_1$, $a_2$ and $a_3$ of the respective weight elements A, B and C and the products are added together. When the sum thus obtained is larger than a threshold value $W\Theta$ which is variable, and output "+1" is delivered from the circuit, while when the sum is smaller than the threshold value $W\Theta$ an output "−1" or "0" is delivered from the circuit. Therefore, the weights may suitably be regulated for a group of $n$ inputs each consisting of a set of numerals so that the output may be classified into two categories consisting of a class "+1" and a class "−1."

FIG. 2 shows the structure of a prior art learning machine employing the logic circuit shown in FIG. 1. Inputs $a$, $b$ and $c$ as described above are applied to an adaptive logic circuit system G having a structure as shown in FIG. 1. The learning machine comprises further an output terminal D, a correction instruction circuit H, a decision system I and a terminal J to which a desired output signal is applied. Upon receiving the three inputs and the two outputs, the decision system I makes a decision as to whether the logical decision reached in the adaptive logic circuit system G is correct or not.

Upon receiving the result of a decision transferred from the decision system I, the correction instruction circuit H issues an instruction to the adaptive logic circuit system G as to how the correction should be made. The weight of each individual adaptive logic circuit is controlled on the basis of the instruction from the correction instruction circuit so that the logic circuits undergo a change. This is termed as "self-organize," and such a manner of learning process is repeated until a correct logical decision is finally reached.

Such a prior art learning machine has been defective in that man must participate in the decision and correction instruction, and no system adapted for controlling such a learning machine in a full-automatic and digital fashion has been proposed yet. The system described above has a great advantage in that it can easily be constructed from integrated circuit elements.

The present invention contemplates the provision of a full-automatic learning machine which possesses the function of decision and correction instruction.

Referring to FIG. 3 showing the basic structure of the learning machine according to the present invention, a group of input patterns $X_1, X_2, X_3, \ldots X_n$ are applied to respective input terminals $1_1, 1_2, 1_3, \ldots 1_n$. These inputs $X_1, X_2, X_3, \ldots X_n$ are multiplied by respective weights $W_1, W_2, W_3, \ldots W_n$ carried by weight elements $Z_1, Z_2, Z_3, \ldots Z_n$ and are summed up by a summing circuit 1 with the result that an output $$\sum_{j=1}^{n} X_j W_j$$

appears at an output terminal of the summing circuit 1. A decision element 2 compares the output $$\sum_{j=1}^{n} X_j W_j$$

from the summing circuit 1 with a threshold value $W_{n+1}$ delivered from a threshold generator 3. Thus, an output "+1" appears at an output terminal 9 of the decision circuit 2 when $$\sum_{j=1}^{n} X_j W_j - W_{n+1} > 0$$

while an output "−1" appears at the output terminal 9 when $$\sum_{j=1}^{n} X_j W_j - W_{n+1} < 0$$

The output at the output terminal 9 is referred to hereinbelow as "an actual output $E_R$." The output $E_R$ is supplied to a comparator 4 wherein the magnitude of the output $E_R$ is compared with the magnitude of a desired output $E_D$. When the two outputs coincide with each other, a "0" appears at an output terminal of the comparator 4, while when these outputs do not coincide with each other, an error voltage or a "1" appears at the output terminal of the comparator 4.

A learning pulse is generated from a gated pulse generator 5 when the error voltage "1" is applied thereto, the learning pulse being then supplied to a control switch circuit 6. The control switch circuit 6 comprises $n$ control switches which are equal in number to the number $n$ of the inputs so that the control switches correspond to the respective input patterns. The control switch which corresponds to the input "1" is solely urged to conduct to allow passage therethrough of the learning pulse. The learning pulse having passed through the conducting control switch is applied to the weight selection circuits $Z_1, Z_2, Z_3, \ldots Z_n$ to increase or decrease the weights.

Figure 4:
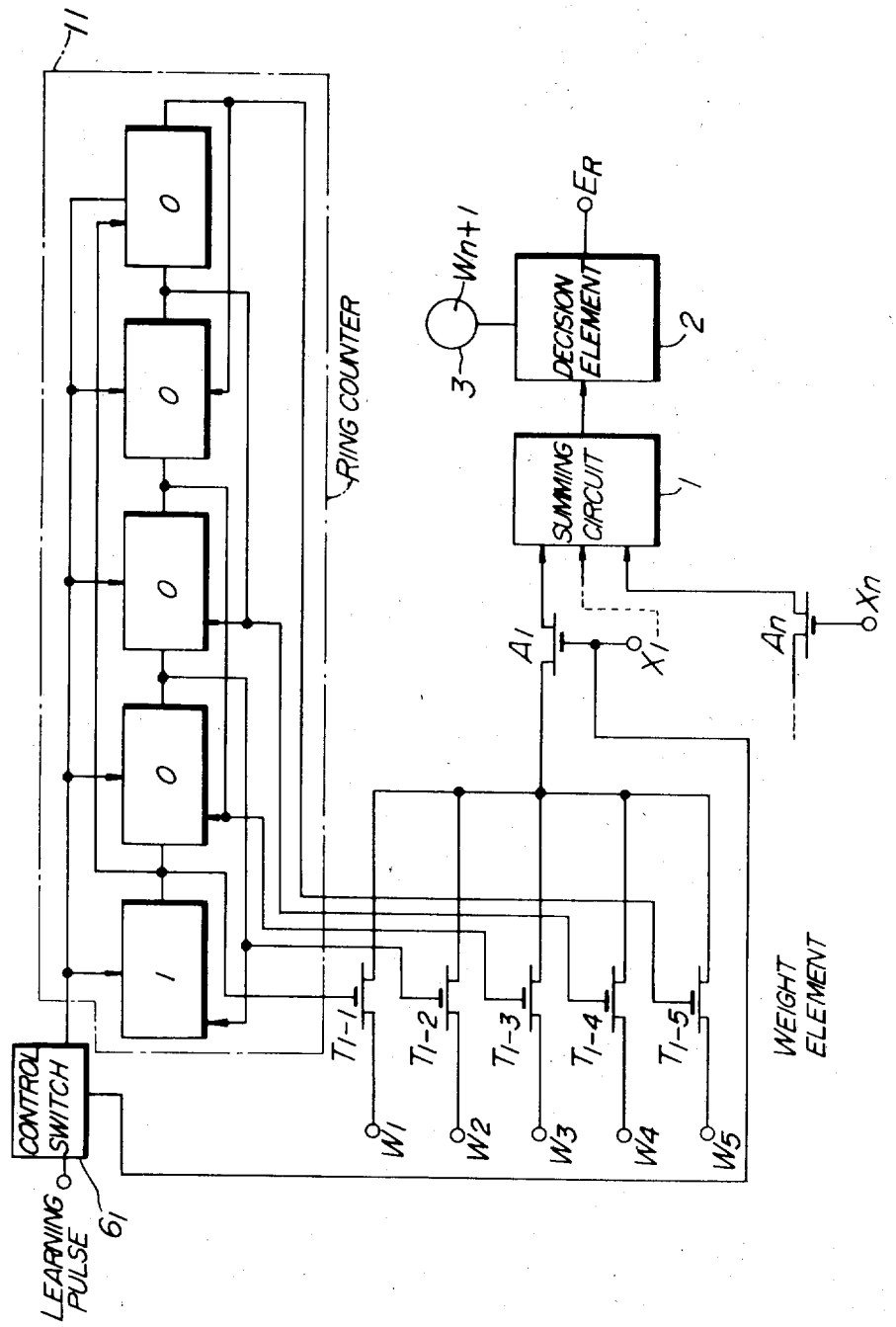
FIG. 4 is a weight selection circuit in the adaptive logic circuit employed in the present invention.

Referring to FIG. 4, there is shown one of the weight elements of the present invention in which each of the weights $W_1, W_2, W_3, \ldots W_n$ can be varied over five stages. When the actual output does not coincide with the desired output, a learning pulse is applied to a control switch $6_1$. The control switch $6_1$ is open and a transistor $A_1$ conducts when the input $X_1$ is "1." Therefore, the learning pulse passes through the control switch $6_1$ to be applied to, for example, a ring counter 11 of the shift register type consisting of five flip-flop circuits. The learning pulse acts to invert a flip-flop circuit in a state of "1" to a state of "0" and to drive the next flip-flop circuit into a state of "1." Thus, the position of "1" is successively shifted by the learning pulse and the ring counter 11 comes back to its initial state after five learning pulses are applied thereto. Accordingly, one of all the transistors $T_{1-1}$, $T_{1-2}$, $T_{1-3}$, $T_{1-4}$ and $T_{1-5}$ which is connected to the output terminal of the flip-flop circuit in the state "1" is solely urged to conduct, and a corresponding control voltage $W_i$ ($i=1, 2, 3, 4, 5$) is selected and applied to the summing circuit 1. Similarly, the weight of the remaining weight elements is varied only when the input "1" appears. The error voltage becomes zero when the output $E_R$ obtained by comparing the output from the summing circuit 1 with the threshold value $W_{n+1}$ in the decision element 2 coincides with the desired output, and the generation of the learning pulse is stopped.

In Fig. 4, the weight is variable over five stages. Therefore, application of one to four learning pulses would bring the desired coincidence between the actual output $E_R$ and the desired output $E_D$. When no coincidence therebetween is reached, an overflow pulse delivered from an N counter 7 (Fig. 3) drives a ring counter 8 (Fig. 3) to vary the threshold value $W_{n+1}$, hence to vary the value of the desired decision function $$\sum_{j=1}^{n} X_j W_j - W_{n+1}$$

so as to effect coincidence between the actual output $E_R$ and the desired output $E_D$. A similar operation may be repeated to automatically vary the weight until the actual output $E_R$ for each input pattern coincides with the desired output $E_D$. By the repetition of learning in the manner described above, the discriminating logic successively approaches a correct one, and at the completion of the learning process, all the input patterns can correctly be classified.

An additional important feature of the present invention resides in the fact that programming may be made in such a manner that a desired output generator 10 generates an output having a sign depending on an input pattern so that teaching can fully automatically be effected. The system described above is advantageous in that the control of the weight of the adaptive logic circuit can fully electronically and digitally be effected in spite of a simple structure, and the system can be constructed from integrated circuit elements. Therefore, the system can operate at a high speed and has a high reliability.

Figure 5A:
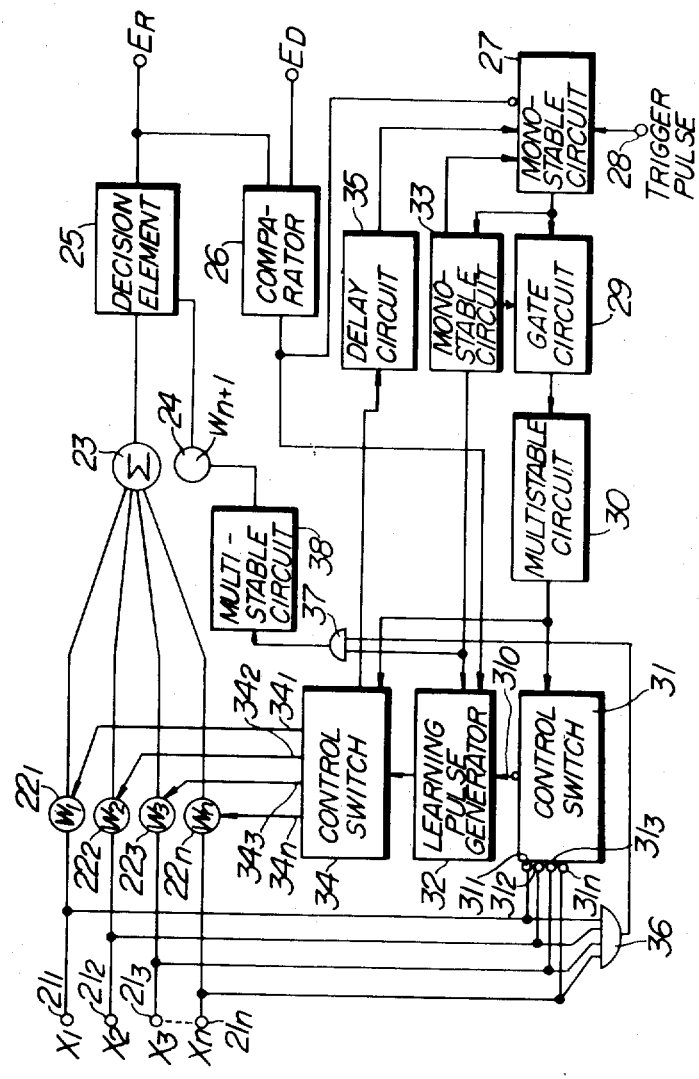
FIG. 5a is a block diagram of an embodiment of the learning machine according to the present invention.

An embodiment of the present invention will be described with reference to FIGS. 5a and 5b. Referring to FIG. 5a, inputs $X_1, X_2, X_3, ... X_n$ are applied to respective input terminals $21_1$, $21_2$, $21_3$, .... $21_n$. Weight elements $22_1$, $22_2$, $22_3$, ... $22_n$ having weights $W_1$, $W_2$, $W_3$, ... $W_n$ are connected with the input terminals $21_1$, $21_2$, $21_3$, .... $21_n$, respectively. Outputs from these weight elements $22_1$, $22_2$, $22_3$, .... $22_n$ are applied to a summing circuit 23 which takes the sum of these outputs. A threshold value $W_{n+1}$ generated by a threshold generator 24 is applied to the decision circuit 25. The sum $$\sum_{j=1}^{n} X_j W_j$$

of the outputs of the weight elements $22_1$, $22_2$, $22_3$, .... $22_n$ is applied together with the threshold value $W_{n+1}$ to a decision element 25. The decision element 25 compares the magnitude of the sum $$\sum_{j=1}^{n} X_j W_j$$

with the magnitude of the threshold value $W_{n+1}$ to deliver an output "+1" when $$\sum_{j=1}^{n} X_j W_j > W_{n+1}$$

and an output "0" when $$\sum_{j=1}^{n} X_j W_j < W_{n+1}$$

The output $E_R$ of the decision element 25 is compared with a desired output $E_D$ in a comparator 26. When the output from the decision element 25 is "1" and the desired output is "0," the comparator 26 delivers an error voltage "+1." Conversely, when the output of the decision element 25 is "0" and the desired output is "1," the comparator 26 delivers an error voltage "−1." The error signal is zero when both outputs coincide with each other. A monostable circuit 27 is urged to its operable state when the error signal "+1" or "−1" is applied thereto. A trigger pulse is supplied from an input terminal 28 to the monostable circuit 27. A gate circuit 29 is connected with an output terminal of the monostable circuit 27. A multistable circuit 30 such as a ring counter is connected with an output terminal of the gate circuit 29. A control switch circuit 31 is connected with an output terminal of the multistable circuit 30 and a control switch therein is urged to conduct when an output from the multistable circuit 30 is applied thereto to open a selected gate. The control switch circuit 31 has an output terminal $31_0$ with which terminals $31_1$, $31_2$, $31_3$, .... $31_n$ connected with the respective input terminals $21_1$, $21_2$, $21_3$, .... $21_n$ are selectively connectable. A learning pulse generator 32, whose gating signal is the output from the control switch circuit 31 and the error signal from the comparator 26, delivers a learning pulse in response to application thereto of an output signal delivered from a monostable circuit 33 connected with the output terminal of the monostable circuit 27. A control switch circuit 34 similar to the control switch 31 is operative in such a manner that one of its internal gates is selected by the output from the multistable circuit 30 so that the output from the pulse generator 32 can appear at one of output terminals $34_1$, $34_2$, $34_3$, .... $34_n$ depending on the selected internal gate. The output from the control switch circuit 34 drives a delay circuit 35 which is operative to hold the monostable circuit 27 at rest for a predetermined time. The outputs appearing at the output terminals $34_1$, $34_2$, $34_3$, .... $34_n$ of the control switch circuit 34 are applied to control terminals of the respective weight elements $22_1$, $22_2$, $22_3$, .... $22_n$ for varying the weights thereof. An AND circuit 36 is provided to take the logical product of the inputs applied to the input terminals $21_1$, $21_2$, $21_3$, ... $21_n$. An AND circuit 37 is provided to take the logical product of the output from the AND circuit 36 and the output from the monostable circuit 33. A circuit 38 such as a multistable circuit is operative in response to application thereto of an output from the AND circuit 37 and is used for varying the threshold value $W_{n+1}$ delivered from the threshold generator 24.

In operation, input patterns $X_1, X_2, X_3, .... X_n$ are applied to the respective input terminals $21_1$, $21_2$, $21_3$, ... $21_n$, and the output $E_R$ from the decision element 25 is compared with the desired output $E_D$ in the comparator 26, which delivers an error signal "+1" or "−1" when the output $E_R$ does not coincide with the desired output $E_D$. The monostable circuit 27 is urged to be operative with the error signal. Then when a trigger pulse is applied to the terminal 28, the monostable circuit 27 delivers an output having a waveform as shown in FIG. 5b, and this output passes through the gate circuit 29 to drive the multistable circuit 30. The control switch 31 operates to connect its output terminal $31_0$ to its input terminals $31_1$, $31_2$, $31_3$, ... $31_n$ in response to the output from the multistable circuit 30 successively. For example, a first output from the circuit 30 drives the switch 31 to connect the terminals $31_0$ to the terminal $31_1$, so that the input $X_1$ is transmitted to the learning pulse generator 32. At this time the generator 32 is urged to be operative if the input $X_1$ is "1" signal. The learning pulse generator 32 is driven by the monostable circuit 33 and delivers a learning pulse for increasing or decreasing the weight depending on the error signal delivered from the comparator 26. The learning pulse is fed through the control switch circuit 34 and the output terminal $34_1$ to the weight element $22_1$ to vary the weight $W_1$ thereof. On the other hand, the delay circuit 35 is enabled to urge and lock the monostable circuit 27 at the rest state. The signal relationship between the relating circuits is shown in Fig. 5b by $x_1=1$, with the input $X_1$ being a "1" signal. The learning process is completed when the output $E_R$ from the decision element 25 coincides with the desired output $E_D$ due to the fact that the comparator 26 delivers an error signal which is zero. If noncoincidence is still present between the actual output $E_R$ and the desired output $E_D$ and an error signal is delivered from the comparator 26, the monostable circuit 27 is actuated again in response to the resetting of the delay circuit 35 or after a certain predetermined delay time and an operation similar to the above is repeated. In this case, the input terminal $31_2$ of the control switch circuit 31 and the output terminal $34_2$ of the control switch circuit 34 are selected to vary the weight $W_2$ of the weight element $22_2$ thereby to effect learning process of the input $X_2$. When the input $X_2$ is "0," the output appearing at the output terminal $31_0$ of the control switch circuit 31 is "0" and no learning pulse is delivered. Thus, the monostable circuit 27 is driven by the output delivered from the monostable circuit 33 so that a new cycle is started again. Such an operation is repeated until the actual output $E_R$ coincides with the desired output $E_D$. As soon as the error voltage becomes zero, the learning process is completed. The learning machine waits for the arrival of new input patterns, and upon arrival of such input patterns, repeats the operation as described above. The learning system described above is based on an absolute correction rule of error correction procedure.

Learning based on the method of error correction will be discussed in detail.
Suppose not that
weight vector $\vec{W}=(W_1, W_2, W_3, .... W_n, W_{n+1})$
input pattern vector $\vec{X}=(X_1, X_2, X_3, .... X_n)$
expanded pattern vector $\vec{Y}=(X_1, X_2, X_3, .... X_n, X_{n+1})$.
Suppose further that the weight victor $\vec{W}$ makes an erroneous response to the expanded pattern vector $\vec{Y}$, then a new weight vector $\vec{W}'$ which is corrected by learning process can be expressed as
$\vec{W}'=\vec{W}+C\vec{Y}$ (in case $\vec{Y}$ falls within the category "+1")
$\vec{W}'=\vec{W}-CY$ (in case $Y$ falls within the category "−1")
where $C$ is a positive number called the correction increment. The so-called method of absolute correction of errors aims at seeking such a value of the correction increment $C$ which will necessarily give a weight vector $\vec{W}$ which makes a correct response to the expanded pattern vector $\vec{Y}$. Since $C=1$ in the fixed-increment rule there are cases that an error may or may not be corrected by a single learning process depending on the value of $W$ and $Y$. In the present invention, embodiments shown in FIGS. 5 and 7 are based on the method of absolute correction of errors, while an embodiment shown in FIG. 6 is based on the method of fixed increment.

Another embodiment of the present invention shown in FIG. 6 comprises an adaptive logic circuit which is the same in structure as that shown in FIG. 5.

Inputs $X_j$ ($j=1, 2, 3, .... n$) are applied from an input unit 41 to weight elements 42 and are multiplied by respective weights $W_j$ ($j=1, 2, 3 .... n$). The multiplied outputs from the weight elements 42 are summed up in a summing circuit 43 which delivers an output $$\sum_{j=1}^{n} X_j W_j$$

The output is compared with a threshold value $W_{n+1}$ in a decision circuit 44 from which an output depending on the relative magnitude of the value $$\sum_{j=1}^{n} X_j W_j$$

and the threshold value $W_{n+1}$ is delivered for supply to a terminal 45. A trigger signal is applied to a terminal 46 when the desired output is "0" or to a terminal 47 when the desired output is "1" so as to drive a "0" signal generator 48 or a "1" signal generator 49. These generators 48 and 49 may be a monostable circuit.

Description will be given with regard to a case in which the desired output $E_D$ is "1" and the output $E_R$ appearing at the terminal 45 is "0." When a trigger signal is applied to the terminal 47, the "1" signal generator 49 is energized and its output is applied to an input terminal of an AND circuit 50. Since the output from the decision element 44 is "0," the output is passed through an inverter 51 and is then applied to the AND circuit 50 which is thereby opened. The output from the AND circuit 50 acts to directly set binary counter circuits 54 and 55 of a square wave generator 53. A t the same time, the output from the AND circuit 50 is applied through an OR circuit 52 to a binary counter circuit 57 of the square wave generator 53. AS a result, the binary counter circuit 57 is set and an AND circuit 58 is placed in a state in which it is ready to open. Application of a pulse from a square wave generator 59 to the AND circuit 58 opens the AND circuit 58 and resets the binary counter circuit 54. At the same time, the binary counter circuit 55 is reset and a monostable circuit 56 is triggered. After a certain predetermined time, the monostable circuit 56 resets the binary counter circuit 57 and the AND circuit 58 is thereby closed. Before the binary counter circuit 57 is reset, the pulse sent out from the square wave generator 59 and passed through the AND circuit 58 drives a control switch circuit 60 to increase the weight of the weight element 42 by one step through a multistable circuit 61 so that the actual output $E_R$ coincides with the desired output $E_D$.

When the actual output $E_R$ is "1" and the desired output $E_D$ is "0," the output from the "0" signal generator 48 is applied to an AND circuit 62 and is passed through the OR circuit 52 to set the binary counter circuit 57. The logical product of the output from the binary counter circuit 57 and the output from the square wave generator 59 appears at the output terminal of the AND circuit 58. The output from the AND circuit 58 drives the binary counter circuits 54 and 55, which are reset in response to arrival of four pulses. At the same time, the monostable circuit 56 is driven to reset the binary counter circuit 57 and to close the AND circuit 58. The four pulses having passed through the AND circuit 58 while the latter is in open position drive the control switch circuit 60 to decrease the weight of the weight element 42 through the multistable circuit 61. Such an operation may be made for each of the inputs so that the discriminating logic of the learning machine successively approaches a correct one. Thus, at the completion of the learning process, all the input patterns can be correctly classified to fall within one of the categories "1" and "0."

According to the above-described method, all the weights are simultaneously increased or decreased by a fixed amount. Thus, the embodiment described above is based on the fixed increment rule of the error correction procedure.

In a further embodiment of the present invention shown in FIG. 7a, inputs $X_j$ ($j=1, 2, 3, .... n$) supplied from an input unit 71 are applied to corresponding weight elements 72 so that they are multiplied by respective weights $W_j$ ($j=1, 2, 3, .... n$) as in the embodiment shown in FIG. 6. The products $X_jW_j$ of the inputs $X_j$ and the weights $W_j$ are summed up in a summing circuit 73, from which an output $$\sum_{j=1}^{n} X_j W_j$$

is delivered. In a decision element 74, the output from the summing circuit 73 is compared with a threshold value delivered form a threshold generator 75, and as a result, an output "1" or "0" appears at an output terminal 76 depending on the relative magnitude of the output from the summing circuit 73 and the threshold value. The output appearing at the terminal 76 is "1" when the output $$\sum_{j=1}^{n} X_j W_j$$

is larger than the threshold value and "0" when the output $$\sum_{j=1}^{n} X_j W_j$$

is smaller than the threshold value.

Description will be given with regard to a case in which the output $E_R$ appearing at the output terminal 76 is "1" and the output from means 77 for generating a desired output $E_D$ is "0." The output "0" from the generator means 77 is passed through an inverter 78 and is then supplied to an AND circuit 80 together with the actual output $E_R$ which is "1." The AND circuit 80 thereby opened delivers the error signal to an OR circuit 82. The output from the OR circuit 82 drives a gated oscillator 83 which generates a learning pulse. The learning pulse is applied to a control switch circuit 84 to vary the weights $W_j$ of the weight elements 72 through a multistable circuit 85.

Conversely, when the actual output $E_R$ is "0" and the desired output $E_D$ is "1," the output "0" from the decision element 74 is passed through an inverter 79 to open an AND circuit 81 so that the error signal passed through the OR circuit 82 acts to vary the weight $W_j$ of the weight element 72.

According to this method, the learning pulses are generated one by one until the operation of the machine is ceased when the actual output $E_R$ coincides with the desired output $E_D$. Thus, the embodiment shown in FIG. 7 is based on the absolute correction rule of the error correction procedure.

What is claimed is:

1. A learning machine comprising, in combination, a plurality of input terminals, weighting means for providing variable weights and connected to the respective input terminals for producing respective products of input signals and provided weights, summing means for summing said products, decision means connected to the outputs of said summing means for comparing the resultant with a threshold value and providing one of its outputs "+1," "0" and "−1" in correspondence with a magnitude relationship obtainable from the comparison between the sum and the threshold value, comparator means for comparing the output of said decision means with a preselected desired output to thereby provide an error signal, error correcting pulse generator means for imparting to said weighting means an error correcting pulse for selectively increasing and decreasing the corresponding weight in correspondence with the error signal of said comparator means, and control switch means for permitting the application of said error correcting pulse to the weighting means that is connected to the input terminal with the input signal "1," said machine being automatically operated to electronically adjust the weights of said weighting means by the error correcting pulses so as to render the output of said decision means consistent with the corresponding desired output, and said operation being stopped with the generation of an error signal of said comparator means equal to zero.

2. A learning machine according to claim 1, wherein said comparator means comprises an anticoincidence circuit having inverter and AND circuits, and said error correcting pulse generator means generating at least one error correcting pulse in response to application thereto of an error signal from said anticoincidence circuit, said control switch means comprising a plurality of control switches for simultaneously varying all weights corresponding to the input terminals with the input signal "1," the learning process being completed when said error signal delivered from said anticoincidence circuit becomes zero due to the fact that the output of said comparator is made equal to the corresponding desired output.

3. A learning machine according to claim 1, further comprising first and second desired output generating means, and wherein said comparator means comprises an anticoincidence circuit having first and second AND circuits having inputs respectively from said first and second desired output generating means, said first AND circuit having an input from said decision means via an inverter, said weighting means having $n$-stepped weights, and said error correcting pulse generator means generating one error correcting pulse responsive to the output of said second AND circuit while generating $n-1$ error correcting pulses responsive to the output of said first AND circuit, whereby all weights corresponding to the input terminals with the input signal "1" are simultaneously changed by one step by at least one error correcting pulse, and the error correcting pulse is generated until the output of said decision means becomes the desired output.

4. A learning machine according to claim 1, in which said weighting means comprises multistable elements, field effect transistors each having two main electrodes one of which is fed with a voltage corresponding to a corresponding weight and a control gate electrode connected to the respective output terminals of said multistable elements, and gating devices controllable by the input signals and connected between the other main electrodes of the transistors and the input terminal of said summing means, said multistable elements comprising a cascade-connection of bistable circuits which is successively shifted to thereby bring about the conduction of the corresponding transistor through its main electrodes in response to the error correcting pulses applied through said control switch means for providing the product signal of the corresponding weight and input signal to be imparted to said summing means for the summation of all the transmitted product signals.

5. A learning machine comprising a plurality of input terminals, a plurality of weight elements connected with the respective input terminals, said weight elements having a variable weight, summing means for summing outputs from said weight elements, a decision element for comparing the resultant output of said summing means with a threshold value thereby selectively delivering one of two kinds of output signals, a comparator for delivering an output signal representing an error between an output of said decision element and a desired output, an error correcting pulse generator for generating an error correcting pulse in response to the error signal delivered from said comparator, and a control switch means for permitting the application of said error correcting pulse to the weight element that is connected to the input terminal with the input signal "1," said machine being automatically operated to electronically select the variable weights of said weight elements by the error correcting pulses so as to render the output of said decision element consistent with the corresponding desire output, and said operation being stopped with the generation of an error signal of said comparator equal to zero.

6. A learning machine according to claim 5, wherein the outputs of said weight elements are composed of input signals on said input terminals multiplied with respective weights, said decision element has a variable threshold generator having a multistable circuit for generating said threshold value, said control switch means having first and second control switch means, said machine further comprising monostable circuit means connected to said comparator and said first control switch means for successively connecting the error correcting pulse generator to said input terminals, said second switch means connected between said error correcting pulse generator and said weight elements for permitting the successive application of the error correcting pulse to the weight elements in response to said monostable circuit means, and delay circuit means connected between said second control switch means and monostable circuit means for holding said monostable means at rest for a predetermined time responsive to the error correcting pulse, said multistable circuit of the threshold generator being connected via AND circuit means to said input terminals and an output of said monostable means for changing the threshold value.